C. ADAMS.
AUTOMOBILE DOOR OPENING AND CLOSING DEVICE.
APPLICATION FILED MAR. 1, 1915.
1,150,090.
Patented Aug. 17, 1915.
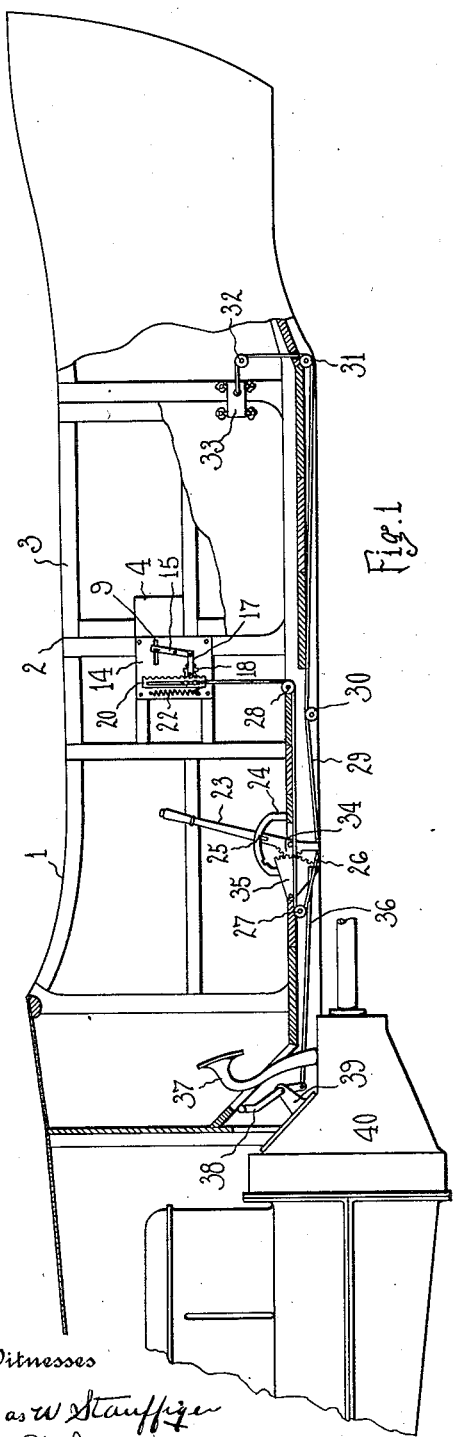
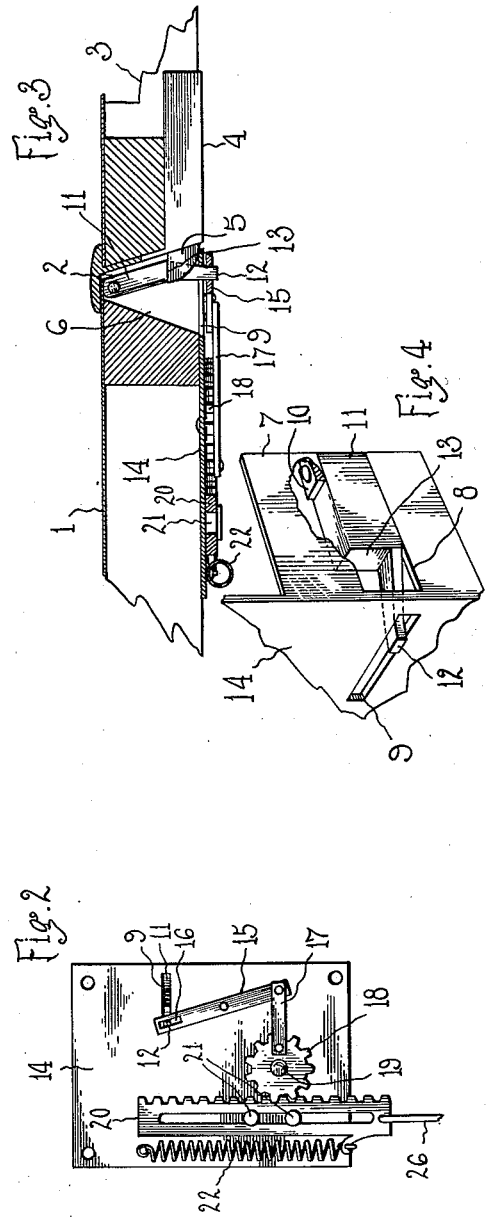
Witnesses
Chas W. Stauffer
Anna M. Dorr.
Inventor
Charles Adams
By
Attorneys

UNITED STATES PATENT OFFICE.

CHARLES ADAMS, OF DETROIT, MICHIGAN.

AUTOMOBILE DOOR OPENING AND CLOSING DEVICE.

1,150,090.  Specification of Letters Patent.  Patented Aug. 17, 1915.

Application filed March 1, 1915. Serial No. 11,420.

*To all whom it may concern:*

Be it known that I, CHARLES ADAMS, a citizen of the United States of America, residing at Detroit, in the county of Wayne and State of Michigan, have invented certain new and useful Improvements in Automobile Door Opening and Closing Devices, of which the following is a specification, reference being had therein to the accompanying drawings.

This invention relates to a door locking device that has been especially designed for the doors of an automobile or other vehicle, although applicable to the doors of a residence as a safeguard to prevent a key from being surreptitiously used in gaining entrance to a residence.

Primarily my invention aims to eliminate such accidents and injuries incurred by persons entering or leaving an automobile as the same is placed in motion or before the automobile has actually stopped, it being a well known fact persons have been thrown and seriously injured.

My invention further aims to provide a door locking mechanism in conjunction with a door closing device both of which are under the control of the chauffeur or operator of the automobile, and provision is made for locking the clutch of the automobile whereby the chauffeur cannot place the machine in operation without automatically closing and locking the door. It is equally impossible for a person to leave the automobile by the doorway thereof unaware to the chauffeur, and it is in this connection that the doors cannot accidentally open and be injured by contacting with other vehicles or objects along a lane of travel.

In the general make-up of the locking mechanism the parts are constructed with a view of reducing the cost of manufacture and at the same time retain the features by which safety, durability, simplicity and ease of assembling are secured, and with such ends in view, my invention resides in the novel construction, combination and arrangement of parts to be hereinafter specifically described and then claimed.

Reference will now be had to the drawings, wherein—

Figure 1 is a side elevation of a portion of an automobile partly broken away and partly in section; Fig. 2 is an enlarged elevation of a portion of the locking mechanism; Fig. 3 is a horizontal sectional view of the locking mechanism associated with a door, and Fig. 4 is a perspective view of a portion of the locking mechanism.

In the drawings, 1 denotes a portion of an automobile body having a doorway 2 and a hinged door 3 provided with a conventional form of door latch (not shown). In addition to the ordinary door latch there is a latch casing 4 containing a spring pressed beveled latch 5 and this latch is adapted to be held whereby the door 3 cannot be opened. The door frame 2 is cut away, as at 6, and provided with a strike plate 7. This plate is slotted, as at 8 and 9 and provided with bearings 10 at an end of the slot 8 for a pivoted keeper 11, said keeper extending into the slot 8 and having an extension 12 protruding through the slot 9. The keeper 11 provides a shoulder 13 and it is behind this shoulder that the beveled latch 5 engages and prevents the door from being swung open, until the keeper 11 is shifted to provide clearance for the latch. Since the latch 5 is beveled, it can readily ride into engagement with the strike plate 7 and the keeper 11, the latch receding until the inner end of the keeper releases the same to engage the shoulder 13. That portion of the strike plate 7 in which the slot 9 is formed is disposed at right angles to the strike plate proper and provides a bearing plate 14 at the doorway for mechanism employed to form the keeper 11. The bearing plate 14 has a fulcrumed arm 15 with the upper end thereof slotted, as at 16 to receive the protruding end of the extension 12 of the keeper. The lower end of the arm 15 is pivotally connected by a link 17 to the sides of a pinion 18 rotatable on a stud 19, carried by the bearing plate. The pinion 18 meshes with a longitudinally slotted rack 20 slidable on the bearing plate and retained in engagement therewith by pins 21 or similar means extending through the slot of the rack. This rack is normally retained in an elevated position by a coiled retractile spring 22 connected to the bearing plate 14 and to the lower end of the rack, as best shown in Fig. 2.

Contiguous to the chauffeur's seat of the automobile body is a pivoted operating lever 23 held in adjusted position by a quadrant 24 and a locking pawl 25, both of which are of the ordinary and well known form. The lower end of the operating lever 23 is connected to a cable 26 trained over a sheave 27, under a sheave 28 and connected to the lower end of the rack 20. The sheaves 27 and 28 are supported by the sills or floor of the automobile body and the floor is cut away to provide clearance for the operating lever 23 and the cable 26. The lower end of the operating lever 23 is also connected to a cable 29 extending over a sheave 30 and under a sheave 31 carried by the sill of the automobile body. The cable 29 extends through the floor and is trained over a sheave 32 carried by the side of the automobile body and connected to a strap 33 which connects the door 3 and the door frame. The strap 33 limits the opening movement of the door 3 and with the cable 29 connected thereto, the operating lever 23 can be manipulated to pull upon the cable 29 and the strap 33 and thereby close the door 3, causing the spring pressed latch 5 to snap into engagement with the keeper 11.

The operating lever 23 has a segment rack 34 meshing with a sector gear 35 pivotally mounted in an opening provided therefor in the floor of the automobile body. Connected to the sector gear 35 is a rod 36, said rod extending into proximity to a clutch pedal 37, which controls the ordinary clutch forming part of the operative mechanism of an automobile. The rod 36 is connected to the lower end of a locking arm 38 movably held by a bracket 39 mounted upon the rear end of a crank case 40 or other part of an automobile.

As shown in Fig. 1, the door 3 is locked in closed position and the clutch pedal 37 is released, thereby indicating that the clutch is in and that the automobile can be started without any danger of a person leaving or entering the automobile by the doorway. In order to release the door 3, whereby it can be opened, it is necessary for the chauffeur to push forwardly upon the operating lever 23 and in so doing the locking arm 38 is thrown into engagement with the clutch pedal 37, thereby holding the clutch pedal whereby the clutch cannot be thrown out, for starting purposes, without the door being closed and locked. Persons having entered the automobile, the chauffeur cannot start the same until the operating lever 23 is pulled rearwardly and as such movement of the operating lever closes the door 3, through the medium of the cable 29 and the strap 33, the keeper 11 engages the latch 5 and locks the door. Simultaneous with the rearward movement of the lever 23 the locking arm 38 is shifted to permit of the clutch pedal 37 being pressed to throw the clutch out, whereby the engine can be started, after which the clutch is thrown in to impart movement to the vehicle.

It is thought that the operation and utility of the device will be apparent without further description, and while in the drawing there is illustrated a preferred embodiment of my invention, it is to be understood that the structural elements are susceptible to such variations and modifications as fall within the scope of the appended claims.

What I claim is:—

1. In a door lock and closing device, the combination with a door frame, a door, and a spring pressed latch carried thereby, of a pivoted keeper adapted to engage said latch and lock said door in a closed position, an operating lever, means adjacent said keeper adapted to move said keeper, a connection between said means and said lever whereby said means is actuated by a forward movement of said lever, and a connection between said door and lever whereby said door is closed by a rearward movement of said lever.

2. In a door lock and closing device, the combination with a door frame, a door, and a spring pressed latch carried thereby, a pivoted keeper adapted to engage said latch and lock said door in a closed position, means including a pinion and rack adjacent said keeper adapted to move the same, an operating lever, a connection between said lever and the rack of said means whereby said means is actuated by a forward movement of said lever to release the latch of said door, and means actuated by a rearward movement of said lever adapted to close said door.

3. An automobile door lock and closing device, the combination with an automobile, having a door frame, a door, and a clutch pedal, of a pivoted keeper adapted to engage said latch and lock said door in a closed position, an operating lever, means adjacent said keeper adapted to move said keeper, a connection between said means and said lever whereby said means is actuated by a forward movement of said lever to release said door, and means actuated by a forward movement of said operating lever to hold said clutch pedal inactive until said door is closed.

4. In a door lock and closing device for automobiles, the combination with an automobile body having a door frame, a door, a spring pressed latch carried thereby, and a clutch pedal controlling the operation of the automobile, of a pivoted keeper adapted to engage said latch and lock said door in a closed position, an operating lever, means adjacent said keeper adapted to move said keeper, a connection between said means and said lever whereby said means is actuated by a forward movement of said lever to release said door, means actuated by a forward movement of said lever to hold said clutch pedal inactive until said door is closed, and means actuated by a rearward movement of said lever for closing said door.

5. The combination with an automobile having a door frame, a door, a spring pressed latch carried thereby, and a clutch pedal, of a pivoted keeper adapted to receive said latch and lock said door in a closed position, an operating lever, means including the rack and pinion adjacent said keeper and adapted to move said keeper, a connection between the rack of said means and said lever whereby said means is actuated by a forward movement of said lever to release said door, means actuated by a forward movement of said lever and including a locking arm for holding said clutch pedal inactive until said door is closed, and a connection between said lever and said door whereby a rearward movement of said lever closes said door and automatically places the latch thereof in engagement with said keeper.

In testimony whereof I affix my signature in presence of two witnesses.

CHARLES ADAMS.

Witnesses:
 ANNA M. DORR,
 KARL H. BUTLER.